United States Patent
Harada et al.

(10) Patent No.: US 6,380,118 B1
(45) Date of Patent: Apr. 30, 2002

(54) NONLINEAR DIELECTRIC CERAMIC, PULSE GENERATING CAPACITOR, HIGH-PRESSURE VAPOR DISCHARGE LAMP CIRCUIT, AND HIGH-PRESSURE VAPOR DISCHARGE LAMP

(75) Inventors: Kazuhiro Harada, Shiga-ken; Harunobu Sano, Kyoto, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/467,998

(22) Filed: Dec. 20, 1999

(30) Foreign Application Priority Data

Dec. 25, 1998 (JP) .............................. 10-369527

(51) Int. Cl.⁷ .................... C04B 35/46; H01J 17/34
(52) U.S. Cl. .................. 501/139; 501/137; 501/138; 315/59
(58) Field of Search ................ 501/137, 138, 501/139; 315/73, 55, 59

(56) References Cited

U.S. PATENT DOCUMENTS

| | | | | |
|---|---|---|---|---|
| 4,447,549 A | * | 5/1984 | Masujima et al. | 501/138 |
| 5,138,231 A | * | 8/1992 | Iida et al. | 315/73 |
| 5,510,305 A | | 4/1996 | Sano | 501/138 |
| 5,801,111 A | * | 9/1998 | Wada et al. | 501/138 |
| 5,818,686 A | * | 10/1998 | Mizuno et al. | 361/311 |

* cited by examiner

Primary Examiner—Cathy Lam
(74) Attorney, Agent, or Firm—Ostrolenk, Faber, Gerb & Soffen, LLP

(57) ABSTRACT

A nonlinear dielectric ceramic having the D-E hysteresis characteristics contains a barium titanate-based compound as a principal constituent and a nonreducing oxide glass as a secondary constituent, and thus the nonlinear dielectric ceramic has reduction resistance. A pulse generating capacitor including the nonlinear dielectric ceramic, a high-pressure vapor discharge lamp circuit including the pulse generating capacitor, and a high-pressure vapor discharge lamp including the pulse generating capacitor are also disclosed.

20 Claims, 4 Drawing Sheets

NONLINEAR DIELECTRIC CERAMIC, PULSE GENERATING CAPACITOR, HIGH-PRESSURE VAPOR DISCHARGE LAMP CIRCUIT, AND HIGH-PRESSURE VAPOR DISCHARGE LAMP

BACKGROUND OF THE INVENTION

1. Field of the Invention

The present invention relates to nonlinear dielectric ceramics for pulse generating capacitors which are used as starters of discharge lamps, pulse generating capacitors in which dielectric ceramics are used as dielectric materials, and high-pressure vapor discharge lamps in which the capacitors are used as starters. More particularly, the invention relates to a nonlinear dielectric ceramic which is suitable for a high-pressure vapor discharge lamp having a starter contained in a bulb.

2. Description of the Related Art

High-pressure vapor discharge lamps, such as a high-pressure sodium lamp, are difficult to start using a commercially-used power-supply voltage and the application of a high pulse voltage is required.

High-pressure vapor discharge lamps, in which starters for generating high pulse voltages are contained in discharge-lamp bulbs and the starters are utilized in combination with ballasts for general high-pressure mercury lamps, have come into wide use. Such a high-pressure vapor discharge lamp basically includes a luminous tube and a capacitor using a nonlinear dielectric ceramic, the luminous tube and the capacitor being connected in parallel, and by combining a solid-state switch (SSS) therewith, a high pulse voltage is generated. The high pulse voltage together with a power-supply voltage is applied to the luminous tube to start the discharge lamp.

As a means for stably generating such a high pulse voltage, a pulse generating capacitor including a nonlinear dielectric ceramic composed of a barium titanate-based compound as a dielectric material has been used.

The pulse generating capacitor has a D-E hysteresis curve in which electric displacement (D) changes steeply in relation to voltage (E), as shown in FIG. 1. If a voltage that is larger than the coercive electric field of the capacitor is applied, the electric charge is abruptly saturated in the vicinity of a polarization inversion voltage. A change in the electric current at this stage also causes a change in ballast, and a high pulse voltage corresponding to $-L \cdot di/dt$ can be generated due to the inductance of the ballast.

The pulse generating capacitor used for a high-pressure vapor discharge lamp such as a high-pressure sodium lamp must have a steep slope of the D-E hysteresis curve, which must be stable over a wide temperature range. Pulse generating capacitors which meet the above requirements are disclosed in Japanese Unexamined Patent Publication Nos. 63-221504, 63-221505, 1-136323, 1-136324, etc.

The bulb of a high-pressure vapor discharge lamp, such as a high-pressure sodium lamp, is usually maintained at a high vacuum of approximately $1 \times 10^{-5}$ torr, and is exposed in a high-temperature high vacuum of 300° C./$1 \times 10^{-5}$ torr. A barium getter for adsorbing oxygen generated during lighting is also disposed in the bulb of the discharge lamp so that the degree of vacuum in the bulb is maintained. However, if the discharge lamp continues to be lit, a reducing atmosphere is produced in the bulb due to hydrogen adsorbed by members such as a luminous tube, the metallic support for the luminous tube, the glass constituting the bulb, and hydrogen generated by the decomposition of adsorbed water.

Therefore, if the pulse generating capacitors disclosed in Japanese Unexamined Patent Publication Nos. 63-221504, 63-221505, 1-136323, 1-136324, etc. are used in bulbs for a long period of time, the dielectric ceramics are reduced and the insulation resistance is decreased, resulting in a low or no pulse voltage being generated, and hence the discharge lamp is not lit.

In order to cope with the above problems, as disclosed in Japanese Unexamined Patent Publication No. 60-52006, the pulse generating capacitor except for a current-carrying section is entirely coated with inorganic glass, or as disclosed in Japanese Unexamined Patent Publication No. 4-34832, a getter for adsorbing hydrogen is disposed in the bulb. However, deterioration is not fully suppressed by the above measures, and the structures of the pulse generating capacitors and discharge lamps may become complex, resulting in an increase in cost. Additionally, if the pulse generating capacitor is entirely coated with inorganic glass as disclosed in Japanese Unexamined Patent Publication No. 60-52006, the D-E hysteresis characteristics of the dielectric ceramic is degraded by the glass, and it may become difficult to obtain a high pulse voltage. Furthermore, production problems may be caused. For example, inconsistencies in the characteristics in the different dielectric ceramic lots may be increased, and warpage may occur in the ceramic when it is fired.

SUMMARY OF THE INVENTION

Accordingly, it is a main object of the present invention to provide a nonlinear dielectric ceramic which is suitable as a dielectric material for obtaining inexpensive pulse generating capacitors, in which the characteristics are not degraded even if exposed in high-temperature high vacuum during lighting and in a reducing atmosphere during use, a high pulse voltage can be generated over a wide temperature range, and inconsistencies in characteristics are decreased, thus enabling stable characteristics in terms of production.

It is another object of the present invention to provide a pulse generating capacitor in which a nonlinear dielectric ceramic is used as a dielectric material.

It is another object of the present invention to provide a high-pressure vapor discharge lamp circuit or a high pressure vapor discharge lamp which uses the pulse generating capacitor as a starter.

In accordance with the present invention, a nonlinear dielectric ceramic having the D-E hysteresis characteristics contains a barium titanate-based compound as a principal constituent and a nonreducing oxide glass as a secondary constituent, and thus the nonlinear dielectric ceramic has reduction resistance.

The content of the nonreducing oxide glass is preferably set at about 0.8 parts by weight or less relative to 100 parts by weight of the barium titanate-based compound.

Preferably, the nonreducing oxide glass contains at least one of Si and Li.

Preferably, the nonreducing oxide glass is one of a first nonreducing oxide glass and a second nonreducing oxide glass, the first nonreducing oxide glass being represented by the formula $Li_2O$—(Si, Ti)$O_2$—MO (where MO is at least one of $Al_2O_3$ and $ZrO_2$), and the second nonreducing oxide glass being represented by the formula $SiO_2$—$TiO_2$—XO (where XO is at least one oxide selected from the group consisting of BaO, CaO, SrO, MgO, ZnO and MnO).

Preferably, the first nonreducing oxide glass is represented by the formula $xLi_2O$-$y(Si_wTi_{1-w})O_2$-$zMO$ (where MO is at least one of $Al_2O_3$ and $ZrO_2$, x, y, and z refer to mole %, and subscript w satisfies the relationship $0.30 \leq w \leq 1.0$). In the ternary composition diagram shown in FIG. 2, the ratio (x, y, z) lies within a polygon, including the sides of the polygon, obtained by linking point A (20, 80, 0), point B (10, 80, 10), point C (10, 70, 20), point D (35, 45, 20), point E (45, 45, 10) and point F (45, 55, 0), (wherein w satisfies the relationship $0.30 \leq w < 1.0$ if the ratio lies on the line A-F).

Preferably, the second nonreducing oxide glass is represented by the formula $xSiO_2\text{-}yTiO_2\text{-}zXO$ (where XO is at least one oxide selected from the group consisting of BaO, CaO, SrO, MgO, ZnO and MnO and x, y, and z refer to mole %). In the ternary composition diagram shown in FIG. 3, the ratio (x, y, z) lies within a polygon, including the sides of the polygon, obtained by linking point A (85, 1, 14), point B (35, 51, 14), point C (30, 20, 50) and point D (39, 1, 60).

Preferably, the second nonreducing oxide glass contains at least one of $Al_2O_3$ and $ZrO_2$ in an amount of about 15 parts by weight or less in total (where the content of $Zro_2$ is about 5 parts by weight or less) relative to 100 parts by weight of the $SiO_2$—$TiO_2$—XO-based nonreducing oxide glass.

Preferably, the second nonreducing oxide glass contains at least one of $Li_2O$ and $B_2O_3$ in an amount of about 20 parts by weight or less in total relative to 100 parts by weight of the $SiO_2$—$TiO_2$—XO-based nonreducing oxide glass.

Preferably, the barium titanate-based compound is represented by the formula $(Ba_{1-x-y-z}Sr_xCa_yMg_zO)_m \cdot (Ti_{1-o-p}Zr_oHf_p)O_2$, wherein subscripts x, y, z, m, o, and p satisfy the relationships $0 \leq x \leq 0.05$, $0 \leq y \leq 0.02$, $0 \leq z \leq 0.005$, $0.995 \leq m \leq 1.02$ and $0.035 \leq o+p \leq 0.12$ (where $0 \leq o \leq 0.12$ and $0 \leq p \leq 0.12$).

Preferably, the nonlinear dielectric ceramic contains an oxide of at least one element selected from the group consisting of La, Ce, Nd, Pr, Sm, Eu, Gd, Tb, Dy, Ho, Er, Yb and Y in an amount of about 0.5 mole or less relative to 100 mole of the barium titanate-based compound.

Preferably, the nonlinear dielectric ceramic contains an oxide of at least one element selected from the group consisting of Mn, Ni, and Co in an amount of about 0.5 mole or less relative to 100 mole of the barium titanate-based compound.

Preferably, the nonlinear dielectric ceramic contains an oxide of at least one element selected from the group consisting of La, Ce, Nd, Pr, Sm, Eu, Gd, Tb, Dy, Ho, Er, Yb and Y and an oxide of at least one element selected from the group consisting of Mn, Ni, and Co in an amount of about 1.0 parts by weight or less in total relative to 100 parts by weight of the barium titanate-based compound.

A pulse generating capacitor in accordance with the present invention is used in a bulb of a high-pressure vapor discharge lamp, and the capacitor includes a dielectric material and electrodes formed on the dielectric material. The dielectric material is composed of the nonlinear dielectric ceramic.

A high-pressure vapor discharge lamp circuit in accordance with the present invention includes a series circuit composed of the pulse generating capacitor and a switch and a luminous tube, the series circuit being electrically connected to the luminous tube in parallel.

A high-pressure vapor discharge lamp in accordance with the present invention includes the pulse generating capacitor and a luminous tube which are electrically connected to each other in parallel and enclosed in a bulb.

DESCRIPTION OF THE PREFERRED EMBODIMENT

Nonlinear dielectric ceramics, pulse generating capacitors, high-pressure vapor discharge lamp circuits, and high-pressure vapor discharge lamps in the present invention will be described with reference to the drawings.

Figure 1:
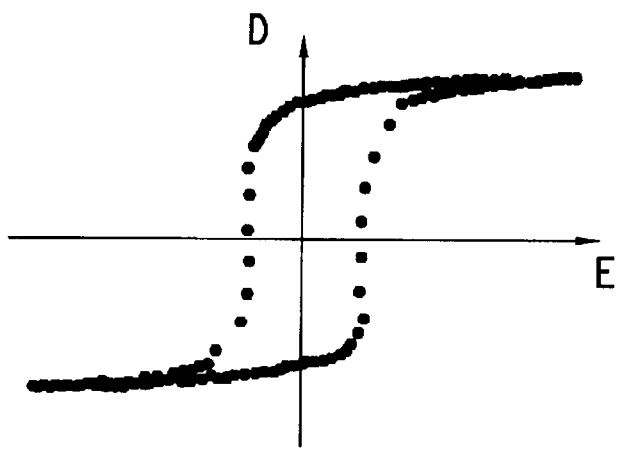
FIG. 1 is an example of a D-E hysteresis loop of a nonlinear dielectric ceramic used for a capacitor in accordance with the present invention.
Figure 4:
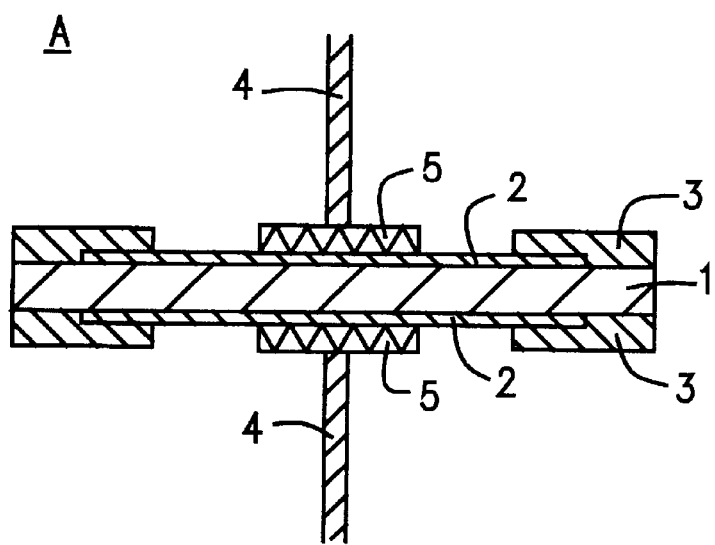
FIG. 4 is a sectional view of a pulse generating capacitor in accordance with the present invention.

FIG. 4 is a sectional view of a pulse generating capacitor including a nonlinear dielectric ceramic in accordance with the present invention. The pulse generating capacitor A is produced by the following method. First, a binder is added to a starting ceramic powder having a predetermined composition. After drying and granulation are performed, a disk-shaped green compact is obtained by pressing or the like. The green compact is fired and a nonlinear dielectric ceramic 1 as a dielectric element is obtained. Next, a pair of electrodes 2 are formed on both principal surfaces of the nonlinear dielectric ceramic 1. An insulating glass 3 is formed in a ring for insulation, and lead terminals 4 are electrically connected to the electrodes 2 with a conductive adhesive 5 or the like, and thus the pulse generating capacitor A is obtained.

The nonlinear dielectric ceramic contains a barium titanate-based compound as a principal constituent and a nonreducing oxide glass as a secondary constituent. Thus, the reduction resistance of the ceramic itself and the steep hysteresis characteristics are obtained, and even if exposed in a high-temperature high vacuum and in a reducing atmosphere, the insulation resistance is not decreased and a high pulse voltage is generated. That is, although the reduction resistance is not obtained only by having the barium titanate-based compound as the principal constituent, the reduction resistance of the ceramic itself is obtained by including the nonreducing oxide glass.

By including the nonreducing oxide glass, inconsistencies in the grain size of the ceramic are reduced and the breakdown voltage is improved as the generated pulse voltage is increased. Furthermore, by including at least an oxide of at least one element selected from the group consisting of Mn, Ni and Co and an oxide of at least one element selected from the group consisting of La, Ce, Nd, Pr, Sm, Eu, Gd, Tb, Dy, Ho, Er, Yb and Y, the generated pulse voltage is further increased.

Figure 5:
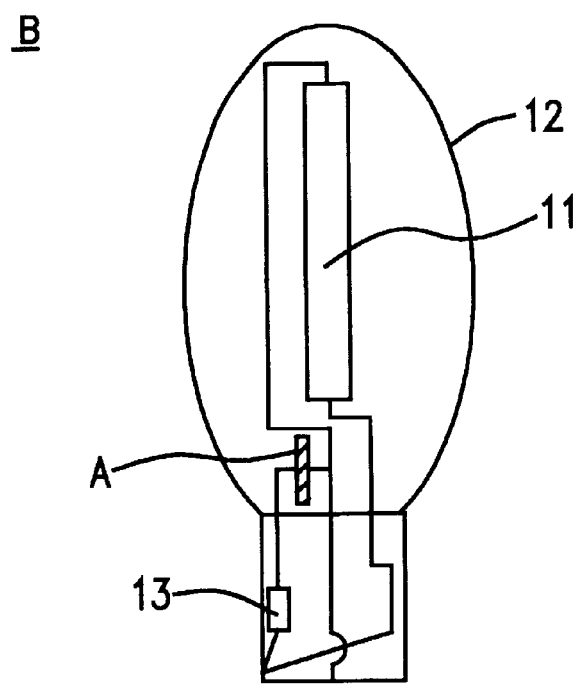
FIG. 5 is a sectional view of a high-pressure vapor discharge lamp in accordance with the present invention.
Figure 6:
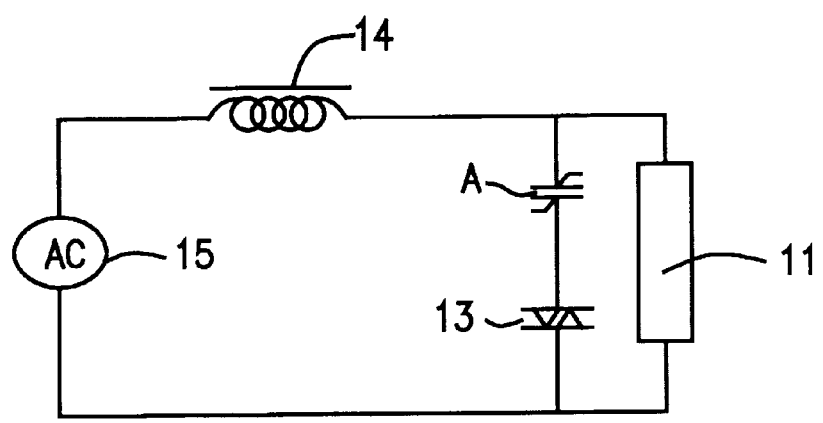
FIG. 6 is a lamp circuit diagram including the high-pressure vapor discharge lamp shown in FIG. 5.

FIG. 5 is a sectional view of a high-pressure vapor discharge lamp in accordance with the present invention, and FIG. 6 is a lamp circuit diagram including the high-pressure vapor discharge lamp. In the high-pressure vapor discharge lamp B, a luminous tube 11 and a pulse generating capacitor A that is connected to the luminous tube 11 in parallel are enclosed in a bulb 12, and a solid-state switch 13 is connected to the pulse generating capacitor A in series. An AC voltage is applied to the high-pressure vapor discharge lamp B through a ballast 14 from an AC power source 15 so that the high-pressure vapor discharge lamp B is lit.

The present invention will be described in more detail based on the examples. However, it is to be understood that the present invention is not limited to such examples.

EXAMPLE 1

First, $BaCO_3$, $SrCO_3$, $CaCO_3$, $MgCO_3$, $TiO_2$, $ZrO_2$ and $HfO_2$ having purities of 99% or more were prepared as starting materials.

Next, the above materials were mixed so that barium titanate-based compounds represented by the formula $(Ba_{1-x-y-z}Sr_xCa_yMg_zO)_m \cdot (Ti_{1-o-p}Zr_oHf_p)O_2$ were obtained, in which subscripts x, y, z, m, o, and p were set as shown in Table 1. The mixed materials were subjected to wet blending with a ball mill, and grinding was performed, followed by drying. Calcining was then performed in air at 1,120° C. for 2 hours. The resultant calcines were ground by a dry grinder, and raw materials having a grain size of 1 µm or less were obtained.

As the first nonreducing oxide glass, a powder was obtained by weighing, mixing, and grinding the oxide, carbonate, or hydroxide of each constituent so as to satisfy the composition of $0.25Li_2O-0.65(0.30TiO_2 \cdot 0.70SiO_2)-0.10Al_2O_3$ (molar ratio).

Similarly, as the second nonreducing oxide glass, a powder was obtained by weighing, mixing and grinding the oxide, carbonate, or hydroxide of each constituent so as to satisfy the composition of $0.66SiO_2-0.17TiO_2-0.15BaO-0.02MnO$ (molar ratio).

Next, each of the powder obtained was separately placed in a platinum crucible and was heated to 1,500° C., followed by quenching. By subsequent grinding, the first and second nonreducing oxide glass powders having average grain sizes of 1 µm or less were obtained.

The starting powders were weighed so as to achieve the compositions shown in Table 1, to which 3% by weight of polyvinyl alcohol and pure water were added, followed by wet blending by a ball mill. After drying and granulation, forming was performed at a pressure of 2 tons/cm² and disk-shaped green compacts were obtained. The resultant green compacts were fired for 2 hours at the temperatures shown in Table 2, and nonlinear dielectric ceramics having a diameter of 18 mm and a thickness of 0.6 mm were obtained.

Electrodes having a diameter of 16 mm were formed on both principal surfaces of each of the nonlinear dielectric ceramics. The electrodes were formed by baking a silver paste. Furthermore, for the purpose of insulation, crystallized glass was formed into a ring having an outer diameter of 17 mm and an inside diameter of 14 mm, and lead terminals were connected, and thus a pulse generating capacitor A was produced. As the lead terminal, a nickel wire was used, which was connected by a silver paste.

Figure 7:
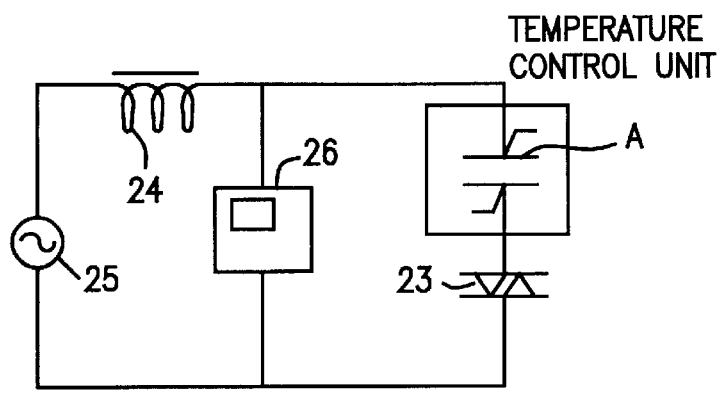
FIG. 7 is a circuit diagram for pulse generation and measurement.

Generated pulse voltages of the capacitors obtained as described above were measured at temperatures of −40° C., room temperature and 50° C., respectively, using the pulse generation and measurement circuit shown in FIG. 7. The pulse generation and measurement circuit included a circuit in which the pulse generating capacitor A produced as described above was placed in a temperature control unit, and a solid-state switch 23 having a breakover voltage of 150 V and a 400 W mercury lamp ballast 24 (input voltage: 220V, 60 Hz) were connected in series, which was connected

TABLE 1

| Sample No. | \multicolumn{7}{c}{$(Ba_{1-x-y-z}Sr_xCa_yMg_zO)_m \cdot (Ti_{1-o-p}Zr_oHf_p)O_2$} | First nonreducing oxide glass (parts by weight) | Second nonreducing oxide glass (parts by weight) |
|---|---|---|---|---|---|---|---|---|---|
| | x | y | z | m | o | p | o + p | | |
| *1 | 0.01 | 0.015 | 0.002 | 0.997 | 0.03 | 0.02 | 0.05 | 0 | 0 |
| 2 | 0.04 | 0.008 | 0.003 | 1.010 | 0.06 | 0.02 | 0.08 | 1.5 | 0 |
| 3 | 0.03 | 0.005 | 0.001 | 1.015 | 0.01 | 0.08 | 0.09 | 0 | 1.5 |
| 4 | 0.08 | 0.01 | 0.004 | 1.000 | 0.02 | 0.05 | 0.07 | 0 | 0.05 |
| 5 | 0.04 | 0.05 | 0.003 | 1.003 | 0.02 | 0.02 | 0.04 | 0.3 | 0 |
| 6 | 0.02 | 0.003 | 0.010 | 0.999 | 0.08 | 0.03 | 0.11 | 0 | 0.4 |
| 7 | 0.02 | 0.012 | 0.003 | 1.008 | 0.005 | 0.005 | 0.01 | 0.1 | 0 |
| 8 | 0.01 | 0.016 | 0.002 | 1.012 | 0.11 | 0.07 | 0.18 | 0 | 0.2 |
| 9 | 0.03 | 0.004 | 0.004 | 0.990 | 0.06 | 0.02 | 0.08 | 0.6 | 0 |
| 10 | 0.02 | 0.008 | 0.003 | 1.050 | 0.01 | 0.03 | 0.04 | 0.05 | 0 |
| 11 | 0.04 | 0.001 | 0.001 | 1.001 | 0.05 | 0.05 | 0.1 | 0.005 | 0 |
| 12 | 0.03 | 0.012 | 0.004 | 1 | 0.04 | 0.02 | 0.06 | 0 | 0.005 |
| 13 | 0.04 | 0.005 | 0.002 | 1.005 | 0.07 | 0.01 | 0.08 | 0.01 | 0 |
| 14 | 0.01 | 0.016 | 0.003 | 1.01 | 0.06 | 0.03 | 0.09 | 0 | 0.2 |
| 15 | 0.02 | 0.01 | 0.002 | 1.003 | 0.04 | 0.03 | 0.07 | 0.8 | 0 |
| 16 | 0.03 | 0.018 | 0.004 | 1.008 | 0.05 | 0.01 | 0.06 | 0 | 0.8 |
| 17 | 0.05 | 0.007 | 0.004 | 0.998 | 0.04 | 0.06 | 0.1 | 0 | 0.05 |
| 18 | 0 | 0.016 | 0.001 | 1.013 | 0.12 | 0 | 0.12 | 0.5 | 0 |
| 19 | 0.04 | 0.02 | 0.002 | 1.006 | 0 | 0.12 | 0.12 | 0 | 0.01 |
| 20 | 0.01 | 0 | 0.001 | 1.001 | 0.06 | 0.05 | 0.11 | 0.2 | 0 |
| 21 | 0.03 | 0.008 | 0.005 | 1.005 | 0.02 | 0.03 | 0.05 | 0 | 0.5 |
| 22 | 0.01 | 0.013 | 0 | 1.015 | 0.06 | 0.01 | 0.07 | 0 | 0.1 |
| 23 | 0.02 | 0.005 | 0.002 | 1.007 | 0.025 | 0.01 | 0.035 | 0.1 | 0 |
| 24 | 0.04 | 0.012 | 0.003 | 1.012 | 0.07 | 0.05 | 0.12 | 0 | 0.3 |
| 25 | 0.04 | 0.01 | 0.004 | 0.995 | 0.02 | 0.06 | 0.08 | 0.01 | 0 |
| 26 | 0.02 | 0.015 | 0.003 | 1.02 | 0.03 | 0.01 | 0.04 | 0.05 | 0 |

*Out of the scope of the present invention to an AC power source 25 (100 V, 60 Hz). The generated pulse voltages were measured by an oscilloscope 26 that was connected between terminals of the series circuit of the pulse generating capacitor A and the solid-state switch 23.

Next, using an insulation testing set, the insulation resistance of the capacitor was measured by applying a direct-current voltage of 100 V for 2 minutes, and the volume resistivity p of the dielectric ceramic was computed.

In order to measure the change in characteristics over time in a high-temperature reducing atmosphere, the capacitor was left in a vacuum chamber under the conditions of 400° C., $1 \times 10^{-5}$ torr, and a hydrogen concentration of 0.5% for 1,000 hours, and then generated pulse voltages at room temperature (20° C.) were measured using the pulse generation and measurement circuit shown in FIG. 7. The insulation resistance was also measured and the volume resistivity $\rho$ was computed.

As a high-temperature load test, samples in which silver electrodes having a diameter of 17 mm were baked on both principal surfaces of nonlinear dielectric ceramics having a diameter of 18 mm and a thickness of 0.6 mm were prepared, and pulse voltages after applying a direct-current voltage of 100 V for 240 hours in an isothermal chamber maintained at 125° C. were measured using the pulse generation and measurement circuit shown in FIG. 7.

Furthermore, as an AC dielectric breakdown test, samples in which silver electrodes having a diameter of 14 mm were baked on both principal surfaces of nonlinear dielectric ceramics having a diameter of 18 mm and a thickness of 0.6 mm were prepared, and while applying an alternating current of 60 Hz under a pressure at 100 Vrms/sec., voltages in which dielectric breakdown occurred in the samples (AC dielectric breakdown voltages) were measured.

The results of the individual tests were shown in Table 2.

As is obvious from Tables 1 and 2, when a pulse generating capacitor using the nonlinear dielectric ceramic in accordance with the present invention, which contains a barium titanate-based compound represented by the formula $(Ba_{1-x-y-z}Sr_xCa_yMg_zO)_m \cdot (Ti_{1-o-p}Zr_oHf_p)O_2$, wherein subscripts x, y, z, m, o, and p satisfy the relationships $0 \leq x \leq 0.05$, $0 \leq y \leq 0.02$, $0 \leq z \leq 0.005$, $0.995 \leq m \leq 1.02$, $0 \leq o \leq 0.12$, $0 \leq p \leq 0.12$ and $0.035 \leq o+p \leq 0.12$, as a principal constituent and a nonreducing oxide glass as a secondary constituent, a high pulse voltage of 1.8 kV or more is generated in the temperature range of −40° C. to 50° C. Moreover, even if exposed in a high-temperature reducing atmosphere, the insulation resistance is not decreased and the generated pulse voltage is not decreased. Furthermore, the AC dielectric breakdown voltage is as high as 6 kVrms/mm or more.

The reason for preferable limitations on the compositions of the nonlinear dielectric ceramic containing a barium titanate-based compound represented by the formula $(Ba_{1-x-y-z}Sr_xCa_yMg_zO)_m \cdot (Ti_{1-o-p}Zr_oHf_p)O_2$ as a principal constituent and a nonreducing oxide glass as a secondary constituent will be described.

When the content of the nonreducing oxide glass is zero in relation to the barium titanate-based compound, as in sample No. 1, by being exposed in a high-temperature reducing atmosphere, the dielectric ceramic is reduced, the insulation resistance is decreased and the pulse voltage is significantly decreased, which is undesirable. As in sample Nos. 2 and 3, when the content of the nonreducing oxide glass is more than 0.8 parts by weight in relation to the barium titanate-based compound, the pulse voltage does not exceed 1.8 kV. With respect to the content of the nonreducing glass, as in sample Nos. 11 and 12, although even at a slight amount of 0.005 parts by weight, satisfactory results

TABLE 2

| Sample No. | Firing temperature (° C.) | Generated pulse voltage (kV) | | | Volume resistivity $\rho$ ($\Omega \cdot m$) | 400° C./1 × 10⁻⁵ Torr/ 0.5% H₂/1000 hr | | 125° C./100 V/240 hr | | AC dielectric breakdown voltage (kV/mm) |
|---|---|---|---|---|---|---|---|---|---|---|
| | | −40° C. | Room temperature | 50° C. | | Generated pulse voltage (kV) | Volume resistivity $\rho$ ($\Omega \cdot m$) | Generated pulse voltage (kV) | Volume resistivity $\rho$ ($\Omega \cdot m$) | |
| *1 | 1470 | 1.38 | 1.34 | 1.31 | $4.42 \times 10^{12}$ | 0.71 | $8.68 \times 10^{7}$ | 1.31 | $4.37 \times 10^{11}$ | 5.12 |
| 2 | 1300 | 1.47 | 1.45 | 1.37 | $2.87 \times 10^{12}$ | 1.44 | $.59 \times 10^{12}$ | 1.41 | $2.87 \times 10^{12}$ | 6.86 |
| 3 | 1310 | 1.52 | 1.48 | 1.41 | $8.27 \times 10^{11}$ | 1.46 | $8.25 \times 10^{11}$ | 1.41 | $8.02 \times 10^{11}$ | 6.92 |
| 4 | 1350 | 1.91 | 1.87 | 1.51 | $2.87 \times 10^{11}$ | 1.87 | $2.84 \times 10^{11}$ | 1.83 | $2.84 \times 10^{11}$ | 6.31 |
| 5 | 1370 | 1.56 | 1.54 | 1.32 | $2.21 \times 10^{12}$ | 0.84 | $4.34 \ '\ 108$ | 1.51 | $2.21 \times 10^{12}$ | 6.54 |
| 6 | 1470 | 1.50 | 1.47 | 1.38 | $4.18 \times 10^{11}$ | 0.79 | $5.92 \times 10^{7}$ | 1.43 | $4.13 \times 10^{11}$ | 6.27 |
| 7 | 1380 | 1.56 | 1.52 | 1.43 | $8.40 \times 10^{11}$ | 1.51 | $8.30 \times 10^{11}$ | 1.49 | $8.14 \times 10^{11}$ | 6.38 |
| 8 | 1350 | 1.63 | 1.61 | 1.22 | $1.91 \times 10^{12}$ | 1.62 | $1.88 \times 10^{12}$ | 1.58 | $1.89 \times 10^{12}$ | 6.51 |
| 9 | 1300 | 1.92 | 1.89 | 1.81 | $2.68 \times 10^{12}$ | 0.97 | $2.68 \times 10^{8}$ | 1.80 | $2.65 \times 10^{12}$ | 4.33 |
| 10 | 1470 | 1.52 | 1.48 | 1.39 | $1.81 \times 10^{12}$ | 1.47 | $1.80 \times 10^{12}$ | 1.45 | $1.79 \times 10^{12}$ | 6.98 |
| 11 | 1390 | 1.91 | 1.87 | 1.83 | $1.08 \times 10^{12}$ | 1.83 | $1.07 \times 10^{12}$ | 1.83 | $1.08 \times 10^{12}$ | 6.02 |
| 12 | 1380 | 1.91 | 1.88 | 1.81 | $2.82 \times 10^{12}$ | 1.81 | $2.83 \times 10^{12}$ | 1.80 | $2.83 \times 10^{12}$ | 6.08 |
| 13 | 1360 | 2.06 | 2.02 | 1.94 | $2.21 \times 10^{12}$ | 2.00 | $2.21 \times 10^{12}$ | 1.98 | $2.20 \times 10^{12}$ | 6.28 |
| 14 | 1380 | 2.09 | 2.05 | 1.96 | $3.14 \times 10^{12}$ | 2.03 | $3.12 \times 10^{12}$ | 2.01 | $3.15 \times 10^{12}$ | 6.61 |
| 15 | 1320 | 1.97 | 1.94 | 1.89 | $2.44 \times 10^{12}$ | 1.90 | $2.43 \times 10^{12}$ | 1.88 | $2.44 \times 10^{12}$ | 6.72 |
| 16 | 1350 | 1.97 | 1.93 | 1.85 | $3.45 \times 10^{12}$ | 1.85 | $3.45 \times 10^{12}$ | 1.83 | $3.43 \times 10^{12}$ | 6.65 |
| 17 | 1390 | 2.00 | 1.98 | 1.90 | $6.53 \times 10^{12}$ | 1.96 | $6.54 \times 10^{12}$ | 1.94 | $6.51 \times 10^{12}$ | 6.12 |
| 18 | 1360 | 1.97 | 1.94 | 1.86 | $6.31 \times 10^{12}$ | 1.92 | $6.30 \times 10^{12}$ | 1.90 | $6.31 \times 10^{12}$ | 6.78 |
| 19 | 1380 | 2.08 | 2.04 | 1.91 | $7.14 \times 10^{12}$ | 2.00 | $7.12 \times 10^{12}$ | 1.98 | $7.12 \times 10^{12}$ | 6.34 |
| 20 | 1390 | 2.03 | 2.01 | 1.93 | $6.42 \times 10^{12}$ | 1.93 | $6.42 \times 10^{12}$ | 1.910 | $6.39 \times 10^{12}$ | 6.49 |
| 21 | 1370 | 1.95 | 1.92 | 1.84 | $3.23 \times 10^{12}$ | 1.90 | $3.23 \times 10^{12}$ | 1.88 | $3.23 \times 10^{12}$ | 6.69 |
| 22 | 1360 | 2.00 | 1.96 | 1.87 | $3.33 \times 10^{12}$ | 1.94 | $3.32 \times 10^{12}$ | 1.92 | $3.33 \times 10^{12}$ | 6.58 |
| 23 | 1370 | 1.88 | 1.84 | 1.81 | $4.83 \times 10^{12}$ | 1.80 | $4.82 \times 10^{12}$ | 1.78 | $4.79 \times 10^{12}$ | 6.32 |
| 24 | 1330 | 1.99 | 1.97 | 1.84 | $5.39 \times 10^{12}$ | 1.89 | $5.40 \times 10^{12}$ | 1.87 | $5.40 \times 10^{12}$ | 6.67 |
| 25 | 1300 | 1.97 | 1.94 | 1.88 | $2.95 \times 10^{12}$ | 1.92 | $2.95 \times 10^{12}$ | 1.9 | $2.95 \times 10^{12}$ | 6.04 |
| 26 | 1390 | 1.97 | 1.93 | 1.82 | $5.36 \times 10^{12}$ | 1.89 | $5.35 \times 10^{12}$ | 1.87 | $5.34 \times 10^{12}$ | 6.85 |

*Out of the scope of the present invention are observed. By setting the content at 0.01 to 0.2 parts by weight, more satisfactory results are observed.

As in sample No. 4, when the Sr content x exceeds 0.05, the pulse voltage at 50° C. does not exceed 1.8 kV. By setting the Sr content at 0.05 or less, the generated pulse voltage can be increased.

As in sample No. 5, when the Ca content y exceeds 0.02, the generated pulse voltage is decreased. By setting the Ca content y at 0.02 or less, a decrease in the generated pulse voltage in a high-temperature reducing atmosphere can be prevented. As in sample No. 6, when the Mg content z exceeds 0.005, the generated pulse voltage does not exceed 1.8 kV. By setting the Mg content z at 0.005 or less, the reduction resistance is improved, and a decrease in the generated pulse in a high-temperature reducing atmosphere does not easily occur.

Furthermore, as in sample No. 7, when the total o+p of the Zr content o and the Hf content p is less than 0.035, the generated pulse voltage is decreased. On the other hand, as in sample No. 8, when the total o+p of the Zr content o and the Hf content p exceeds 0.12, the generated pulse voltage does not exceed 1.8 kV.

As in sample No. 9, when the molar ratio m is less than 0.995, if exposed in a high-temperature reducing atmosphere, the dielectric ceramic is reduced, the insulation resistance is decreased and the generated pulse voltage is significantly decreased. The AC dielectric breakdown also does not exceed 6 kV/mm. On the other hand, as in sample No. 10, when the molar ratio m exceeds 1.02, the generated pulse voltage is decreased.

EXAMPLE 2

In a manner similar to that in example 1, raw materials for a barium titanate-based compound represented by the formula

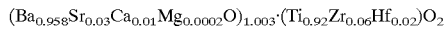

$(Ba_{0.958}Sr_{0.03}Ca_{0.01}Mg_{0.0002}O)_{1.003} \cdot (Ti_{0.92}Zr_{0.06}Hf_{0.02})O_2$ were prepared. $Li_2O$—(Si, Ti)$O_2$—MO-based (where MO is at least one of $Al_2O_3$ and $ZrO_2$) first nonreducing oxide glass was added thereto, the first nonreducing oxide glass having the compositions and amounts shown in Table 3, produced at temperatures of 1,200° C. to 1,500° C., and having an average grain size of 1 μm or less. At the firing temperatures shown in Table 4, and otherwise in a manner similar to that in example 1, pulse generating capacitors were produced. The size and shape of the pulse generating capacitors were the same as those in example 1.

Next, in a manner similar to that in example 1, the generated pulse voltage, the volume resistivity and the AC dielectric breakdown voltage were obtained. The results are shown in Table 4.

TABLE 3

| | | First nonreducing oxide glass | | | | |
|---|---|---|---|---|---|---|
| Sample | Amount added | Composition (mole %, excluding w) | | | | |
| No. | (parts by weight) | $Li_2O$ | $(Si_wTi_{1-w})O_2$ | w | $Al_2O_3$ | $ZrO_2$ |
| 101 | 0.01 | 20 | 80 | 0.3 | 0 | 0 |
| 102 | 0.08 | 10 | 80 | 0.6 | 5 | 5 |
| 103 | 0.15 | 10 | 70 | 0.5 | 20 | 0 |
| 104 | 0.1 | 35 | 45 | 1 | 10 | 10 |
| 105 | 0.05 | 45 | 45 | 0.5 | 10 | 0 |
| 106 | 0.01 | 45 | 55 | 0.3 | 0 | 0 |
| 107 | 0.12 | 20 | 70 | 0.6 | 5 | 5 |
| 108 | 0.06 | 20 | 70 | 0.4 | 10 | 0 |
| 109 | 0.18 | 30 | 60 | 0.7 | 5 | 5 |
| 110 | 0.05 | 30 | 60 | 0.8 | 10 | 0 |
| 111 | 0.1 | 40 | 50 | 0.6 | 5 | 5 |
| 112 | 0.07 | 40 | 50 | 0.9 | 0 | 10 |
| 113 | 0.03 | 10 | 85 | 0.4 | 5 | 0 |
| 114 | 0.16 | 5 | 75 | 0.6 | 10 | 10 |
| 115 | 0.12 | 20 | 55 | 0.5 | 25 | 0 |
| 116 | 0.05 | 45 | 40 | 0.8 | 0 | 15 |
| 117 | 0.03 | 50 | 45 | 0.7 | 5 | 0 |
| 118 | 0.14 | 25 | 75 | 0.9 | 0 | 0 |
| 119 | 0.11 | 25 | 75 | 1 | 0 | 0 |
| 120 | 0.1 | 35 | 65 | 0.9 | 0 | 0 |
| 121 | 0.06 | 35 | 65 | 1 | 0 | 0 |
| 122 | 0.13 | 20 | 70 | 0.2 | 0 | 10 |

TABLE 4

| Sample No. | Firing temperature (° C.) | Generated pulse voltage (kV) | | | Volume resistivity ρ (Ω · m) | 400° C./1 × 10⁻⁵ Torr/ 0.5% $H_2$/1000 hr | | 125° C./100 V/240 hr | | AC dielectric breakdown voltage (kV/mm) |
|---|---|---|---|---|---|---|---|---|---|---|
| | | −40° C. | Room temperature | 50° C. | | Generated pulse voltage (kV) | Volume resistivity ρ (Ω · m) | Generated pulse voltage (kV) | Volume resistivity ρ (Ω · m) | |
| 101 | 1380 | 1.98 | 1.95 | 1.90 | $3.28 \times 10^{12}$ | 1.91 | $3.27 \times 10^{12}$ | 1.87 | $2.14 \times 10^{12}$ | 6.08 |
| 102 | 1350 | 1.94 | 1.92 | 1.89 | $2.08 \times 10^{12}$ | 1.88 | $2.08 \times 10^{12}$ | 1.82 | $1.17 \times 10^{12}$ | 6.42 |
| 103 | 1360 | 2.00 | 1.97 | 1.93 | $3.91 \times 10^{12}$ | 1.93 | $3.89 \times 10^{12}$ | 1.89 | $2.65 \times 10^{12}$ | 6.51 |
| 104 | 1370 | 1.95 | 1.93 | 1.90 | $6.28 \times 10^{12}$ | 1.89 | $6.29 \times 10^{12}$ | 1.83 | $4.79 \times 10^{12}$ | 6.41 |
| 105 | 1350 | 1.92 | 1.89 | 1.85 | $1.88 \times 10^{12}$ | 1.85 | $1.87 \times 10^{12}$ | 1.80 | $1.02 \times 10^{12}$ | 6.25 |
| 106 | 1340 | 1.94 | 1.91 | 1.88 | $2.06 \times 10^{12}$ | 1.87 | $2.06 \times 10^{12}$ | 1.81 | $1.52 \times 10^{12}$ | 6.13 |
| 107 | 1380 | 1.96 | 1.94 | 1.89 | $6.62 \times 10^{12}$ | 1.90 | $6.61 \times 10^{12}$ | 1.84 | $6.14 \times 10^{12}$ | 6.47 |
| 108 | 1370 | 1.95 | 1.93 | 1.89 | $3.51 \times 10^{12}$ | 1.89 | $3.50 \times 10^{12}$ | 1.89 | $2.87 \times 10^{12}$ | 6.31 |
| 109 | 1350 | 1.90 | 1.87 | 1.82 | $3.06 \times 10^{12}$ | 1.83 | $3.04 \times 10^{12}$ | 1.84 | $2.55 \times 10^{12}$ | 6.59 |
| 110 | 1340 | 1.88 | 1.86 | 1.82 | $4.15 \times 10^{12}$ | 1.82 | $4.15 \times 10^{12}$ | 1.83 | $3.76 \times 10^{12}$ | 6.24 |
| 111 | 1380 | 1.95 | 1.92 | 1.89 | $5.26 \times 10^{12}$ | 1.88 | $5.25 \times 10^{12}$ | 1.90 | $4.71 \times 10^{12}$ | 6.36 |

TABLE 4-continued

| | Firing temperature (° C.) | Generated pulse voltage (kV) | | | Volume resistivity ρ (Ω · m) | 400° C./1 × 10⁻⁵ Torr/ 0.5% H₂/1000 hr | | 125° C./100 V/240 hr | | AC dielectric breakdown voltage (kV/mm) |
|---|---|---|---|---|---|---|---|---|---|---|
| Sample No. | | −40° C. | Room temperature | 50° C. | | Generated pulse voltage (kV) | Volume resistivity ρ (Ω · m) | Generated pulse voltage (kV) | Volume resistivity ρ (Ω · m) | |
| 112 | 1340 | 1.95 | 1.93 | 1.89 | $5.66 \times 10^{12}$ | 1.89 | $5.67 \times 10^{12}$ | 1.88 | $5.02 \times 10^{12}$ | 6.34 |
| 113 | 1470 | 1.37 | 1.34 | 1.29 | $2.45 \times 10^{10}$ | 0.75 | $6.68 \times 10^{7}$ | 1.31 | $9.67 \times 10^{8}$ | 5.23 |
| 114 | 1470 | Unable to measure due to insufficient sintering | | | | | | | | |
| 115 | 1470 | Unable to measure due to insufficient sintering | | | | | | | | |
| 116 | 1470 | 1.52 | 1.48 | 1.44 | $5.42 \times 10^{10}$ | 0.74 | $7.69 \times 10^{7}$ | 1.44 | $1.90 \times 10^{8}$ | 5.16 |
| 117 | 1470 | 1.44 | 1.41 | 1.38 | $5.91 \times 10^{10}$ | 0.72 | $4.06 \times 10^{7}$ | 1.39 | $4.40 \times 10^{8}$ | 5.19 |
| 118 | 1360 | 1.89 | 1.84 | 1.81 | $5.84 \times 10^{12}$ | 1.82 | $5.83 \times 10^{12}$ | 1.81 | $5.84 \times 10^{12}$ | 6.62 |
| 119 | 1470 | Unable to measure due to insufficient sintering | | | | | | | | |
| 120 | 1350 | 1.91 | 1.87 | 1.83 | $5.39 \times 10^{12}$ | 1.83 | $5.39 \times 10^{12}$ | 1.82 | $5.38 \times 10^{12}$ | 6.51 |
| 121 | 1470 | 1.63 | 1.61 | 1.59 | $2.44 \times 10^{10}$ | 0.76 | $8.66 \times 10^{7}$ | 1.52 | $6.53 \times 10^{8}$ | 5.02 |
| 122 | 1470 | Unable to measure due to insufficient sintering | | | | | | | | |

Figure 2:
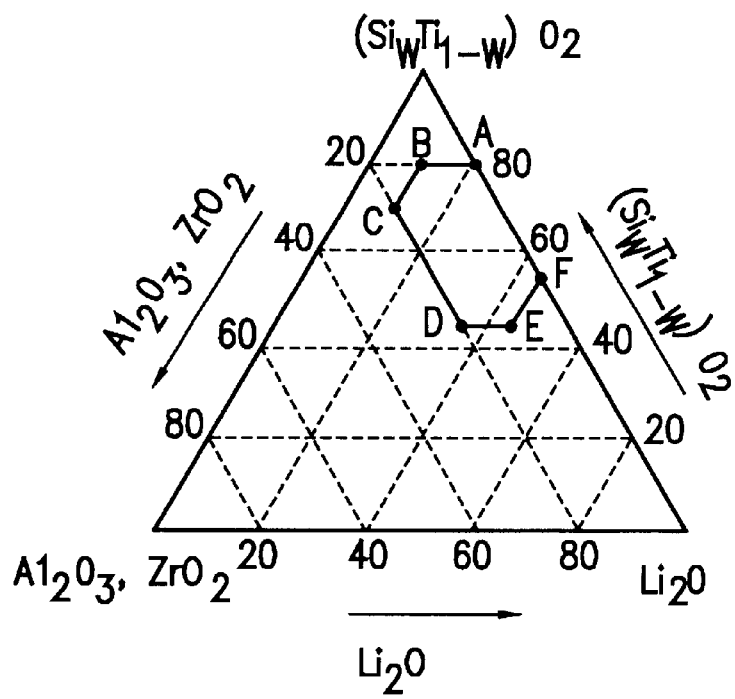
FIG. 2 is a ternary composition diagram of an $Li_2O$—(Si, Ti)$O_2$—MO-based nonreducing oxide glass.

As is obvious from Tables 3 and 4 with respect to the first nonreducing oxide glass represented by the formula $xLi_2O$-$y(SiwTi_{1-w})O_2$-$zMO$ (where MO is at least one of $Al_2O_3$ and $ZrO_2$, x, y, and z refer to mole %, and subscript w satisfies the relationship $0.30 \leq w \leq 1.0$), when, in the ternary composition diagram shown in FIG. 2, the ratio (x, y, z) lies within a polygon, including the sides of the polygon, obtained by linking point A (20, 80, 0), point B (10, 80, 10), point C (10, 70, 20), point D (35, 45, 20), point E (45, 45, 10) and point F (45, 55, 0), (where w satisfies the relationship $0.30 \leq w \leq 1.0$ if the ratio lies on the line A-F), namely, in sample Nos. 101 to 112, 118 and 120, the generated pulse voltage exceeds 1.8 kV, and even if exposed in a high-temperature reducing atmosphere, the generated pulse voltage is not easily decreased.

In contrast, when the $Li_2O$—$(SiwTi_{1-w})O_2$—MO-based nonreducing oxide glass is out of the compositional range described above, as in sample Nos. 113 to 117, 119, 121 and 122, either sintering becomes insufficient or the pulse voltage does not exceed 1.8 kV and the AC dielectric breakdown voltage does not exceed 6 kV/mm.

EXAMPLE 3

In a manner similar to that in example 1, raw materials for a barium titanate-based compound represented by the formula $(Ba_{0.958}Sr_{0.03}Ca_{0.01}Mg_{0.002}O)_{1.003} \cdot (Ti_{0.92}Zr_{0.06}Hf_{0.02})O_2$ were prepared. $SiO_2$—$TiO_2$—XO-based (where XO is at least one oxide selected from the group consisting of BaO, CaO, SrO, MgO, ZnO and MnO) second nonreducing oxide glass was added thereto, the second nonreducing oxide glass having the compositions and amounts shown in Table 5, produced at temperatures of 1,200° C. to 1,500° C., and having an average grain size of 1 μm or less. At the firing temperatures shown in Table 6, and otherwise in a manner similar to that in example 1, pulse generating capacitors were produced. The size and shape of the pulse generating capacitors were the same as those in example 1.

Next, in a manner similar to that in example 1, the generated pulse voltage, the volume resistivity and the AC dielectric breakdown voltage were obtained. The results are shown in Table 6.

TABLE 5

| | | Second nonreducing oxide glass | | | | | | | | | | | | |
|---|---|---|---|---|---|---|---|---|---|---|---|---|---|---|
| | Amount added (parts by weight) | Major constituents (mole %) | | | | | | | | Additive (parts by weight) | | | | |
| Sample No. | | $SiO_2$ | $TiO_2$ | XO | | | | | | | $Al_2O_3$ | $ZrO_2$ | $Li_2O$ | $B_2O_3$ |
| | | | | BaO | CaO | SrO | MgO | ZnO | MnO | Total | | | | |
| 201 | 0.05 | 85 | 1 | 1 | 0 | 0 | 0 | 4 | 9 | 14 | 0 | 0 | 0 | 0 |
| 202 | 0.11 | 35 | 51 | 0 | 10 | 0 | 0 | 0 | 4 | 14 | 0 | 0 | 0 | 0 |
| 203 | 0.12 | 30 | 20 | 0 | 30 | 0 | 15 | 4 | 1 | 50 | 0 | 0 | 0 | 0 |
| 204 | 0.06 | 39 | 1 | 20 | 20 | 2 | 0 | 13 | 5 | 60 | 0 | 0 | 0 | 0 |
| 205 | 0.08 | 70 | 10 | 5 | 5 | 0 | 0 | 10 | 0 | 20 | 0 | 0 | 0 | 0 |
| 206 | 0.15 | 45 | 10 | 0 | 0 | 0 | 0 | 15 | 30 | 45 | 0 | 0 | 0 | 0 |
| 207 | 0.1 | 50 | 20 | 10 | 10 | 3 | 7 | 0 | 0 | 30 | 0 | 0 | 0 | 0 |
| 208 | 0.07 | 50 | 30 | 0 | 16 | 0 | 0 | 0 | 4 | 20 | 0 | 0 | 0 | 0 |
| 209 | 0.13 | 35 | 30 | 25 | 10 | 0 | 0 | 0 | 0 | 35 | 0 | 0 | 0 | 0 |
| 210 | 0.06 | 40 | 40 | 10 | 0 | 0 | 0 | 5 | 5 | 20 | 0 | 0 | 0 | 0 |
| 211 | 0.12 | 45 | 22 | 3 | 30 | 0 | 0 | 0 | 0 | 33 | 15 | 0 | 0 | 0 |
| 212 | 0.05 | 45 | 22 | 3 | 30 | 0 | 0 | 0 | 0 | 33 | 10 | 5 | 0 | 0 |
| 213 | 0.15 | 50 | 30 | 0 | 16 | 0 | 0 | 0 | 4 | 20 | 0 | 0 | 5 | 0 |
| 214 | 0.06 | 35 | 51 | 0 | 10 | 0 | 0 | 0 | 4 | 14 | 0 | 5 | 0 | 5 |
| 215 | 0.14 | 70 | 10 | 5 | 5 | 0 | 0 | 10 | 0 | 20 | 0 | 0 | 20 | 0 |
| 216 | 0.1 | 30 | 20 | 0 | 30 | 0 | 15 | 4 | 1 | 50 | 0 | 0 | 0 | 10 |
| 217 | 0.03 | 65 | 25 | 5 | 5 | 0 | 0 | 0 | 0 | 10 | 0 | 0 | 0 | 0 |
| 218 | 0.14 | 25 | 40 | 15 | 0 | 10 | 0 | 5 | 5 | 35 | 0 | 0 | 0 | 0 |
| 219 | 0.01 | 30 | 10 | 30 | 25 | 0 | 0 | 5 | 0 | 60 | 0 | 0 | 0 | 0 |

TABLE 5-continued

| | | | | | | | | | | | | | | |
|---|---|---|---|---|---|---|---|---|---|---|---|---|---|---|
| | | Second nonreducing oxide glass | | | | | | | | | | | | |
| | Amount | Major constituents (mole %) | | | | | | | | | | | | |
| Sample | added (parts | | | | | XO | | | | | Additive (parts by weight) | | | |
| No. | by weight) | $SiO_2$ | $TiO_2$ | BaO | CaO | SrO | MgO | ZnO | MnO | Total | $Al_2O_3$ | $ZrO_2$ | $Li_2O$ | $B_2O_3$ |
| 220 | 0.1 | 50 | 0 | 35 | 15 | 0 | 0 | 0 | 0 | 50 | 0 | 0 | 0 | 0 |
| 221 | 0.16 | 45 | 22 | 30 | 0 | 0 | 3 | 0 | 0 | 33 | 25 | 0 | 0 | 0 |
| 222 | 0.03 | 45 | 22 | 30 | 0 | 3 | 0 | 0 | 0 | 33 | 0 | 15 | 0 | 0 |
| 223 | 0.18 | 30 | 60 | 10 | 0 | 0 | 0 | 0 | 0 | 10 | 0 | 0 | 0 | 0 |
| 224 | 0.05 | 30 | 20 | 0 | 30 | 0 | 15 | 4 | 1 | 50 | 0 | 0 | 10 | 15 |
| 225 | 0.16 | 50 | 20 | 10 | 10 | 3 | 7 | 0 | 0 | 30 | 0 | 0 | 25 | 0 |

TABLE 6

| Sample No. | Firing temperature (° C.) | Generated pulse voltage (kV) −40° C. | Room temperature | 50° C. | Volume resistivity ρ (Ω · m) | 400° C./1 × 10⁻⁵ Torr/ Generated pulse voltage (kV) | 0.5% $H_2$/1000 hr Volume resistivity ρ (Ω · m) | 125° C./100 V/240 hr Generated pulse voltage (kV) | Volume resistivity ρ (Ω · m) | AC dielectric breakdown voltage (kV/mm) |
|---|---|---|---|---|---|---|---|---|---|---|
| 201 | 1370 | 1.92 | 1.89 | 1.84 | $2.06 \times 10^{12}$ | 1.85 | $2.06 \times 10^{12}$ | 1.86 | $1.79 \times 10^{12}$ | 6.24 |
| 202 | 1360 | 2.03 | 2.01 | 1.97 | $2.43 \times 10^{12}$ | 1.99 | $2.42 \times 10^{12}$ | 1.94 | $2.01 \times 10^{12}$ | 6.51 |
| 203 | 1350 | 1.95 | 1.92 | 1.87 | $3.45 \times 10^{12}$ | 1.87 | $3.45 \times 10^{12}$ | 1.88 | $2.85 \times 10^{12}$ | 6.53 |
| 204 | 1370 | 2.00 | 1.97 | 1.91 | $2.68 \times 10^{12}$ | 1.94 | $2.66 \times 10^{12}$ | 1.94 | $2.14 \times 10^{12}$ | 6.31 |
| 205 | 1350 | 1.95 | 1.93 | 1.88 | $3.79 \times 10^{12}$ | 1.89 | $3.79 \times 10^{12}$ | 1.87 | $3.34 \times 10^{12}$ | 6.43 |
| 206 | 1360 | 2.12 | 2.09 | 2.01 | $6.18 \times 10^{12}$ | 2.04 | $6.19 \times 10^{12}$ | 2.04 | $5.87 \times 10^{12}$ | 6.64 |
| 207 | 1370 | 2.07 | 2.05 | 1.99 | $6.94 \times 10^{12}$ | 2.01 | $6.93 \times 10^{12}$ | 2.01 | $6.49 \times 10^{12}$ | 6.48 |
| 208 | 1370 | 2.06 | 2.02 | 1.97 | $2.00 \times 10^{12}$ | 1.99 | $2.01 \times 10^{12}$ | 1.99 | $1.74 \times 10^{12}$ | 6.35 |
| 209 | 1340 | 1.90 | 1.87 | 1.82 | $6.06 \times 10^{12}$ | 1.83 | $6.05 \times 10^{12}$ | 1.85 | $5.81 \times 10^{12}$ | 6.54 |
| 210 | 1380 | 1.88 | 1.86 | 1.81 | $3.55 \times 10^{12}$ | 1.83 | $3.53 \times 10^{12}$ | 1.82 | $3.23 \times 10^{12}$ | 6.32 |
| 211 | 1340 | 1.94 | 1.92 | 1.87 | $3.96 \times 10^{12}$ | 1.88 | $3.96 \times 10^{12}$ | 1.90 | $3.65 \times 10^{12}$ | 6.52 |
| 212 | 1370 | 1.91 | 1.93 | 1.86 | $4.21 \times 10^{12}$ | 1.90 | $4.20 \times 10^{12}$ | 1.88 | $4.01 \times 10^{12}$ | 6.22 |
| 213 | 1360 | 1.94 | 1.90 | 1.84 | $1.86 \times 10^{12}$ | 1.86 | $1.85 \times 10^{12}$ | 1.84 | $1.66 \times 10^{12}$ | 6.24 |
| 214 | 1350 | 1.91 | 1.89 | 1.82 | $7.94 \times 10^{12}$ | 1.86 | $7.91 \times 10^{12}$ | 1.83 | $7.88 \times 10^{12}$ | 6.34 |
| 215 | 1380 | 1.95 | 1.91 | 1.85 | $5.72 \times 10^{12}$ | 1.86 | $5.68 \times 10^{12}$ | 1.84 | $5.55 \times 10^{12}$ | 6.12 |
| 216 | 1370 | 1.96 | 1.93 | 1.86 | $6.88 \times 10^{12}$ | 1.88 | $6.81 \times 10^{12}$ | 1.85 | $6.61 \times 10^{12}$ | 6.28 |
| 217 | 1470 | 1.51 | 1.45 | 1.42 | $6.49 \times 10^{10}$ | 0.86 | $2.03 \times 10^{7}$ | 1.42 | $3.89 \times 10^{8}$ | 5.67 |
| 218 | 1470 | Unable to measure due to insufficient sintering | | | | | | | | |
| 219 | 1470 | 1.55 | 1.52 | 1.43 | $2.43 \times 10^{10}$ | 0.81 | $5.67 \times 10^{7}$ | 1.48 | $6.75 \times 10^{8}$ | 5.35 |
| 220 | 1470 | Unable to measure due to insufficient sintering | | | | | | | | |
| 221 | 1470 | Unable to measure due to insufficient sintering | | | | | | | | |
| 222 | 1470 | 1.42 | 1.37 | 1.29 | $3.79 \times 10^{10}$ | 0.79 | $6.02 \times 10^{7}$ | 1.34 | $6.34 \times 10^{8}$ | 5.76 |
| 223 | 1470 | Unable to measure due to insufficient sintering | | | | | | | | |
| 224 | 1470 | 1.62 | 1.58 | 1.44 | $2.52 \times 10^{12}$ | 1.56 | $2.46 \times 10^{12}$ | 1.55 | $2.39 \times 10^{12}$ | 6.22 |
| 225 | 1470 | 1.63 | 1.61 | 1.45 | $5.03 \times 10^{12}$ | 1.61 | $4.99 \times 10^{12}$ | 1.59 | $4.88 \times 10^{12}$ | 6.16 |

Figure 3:
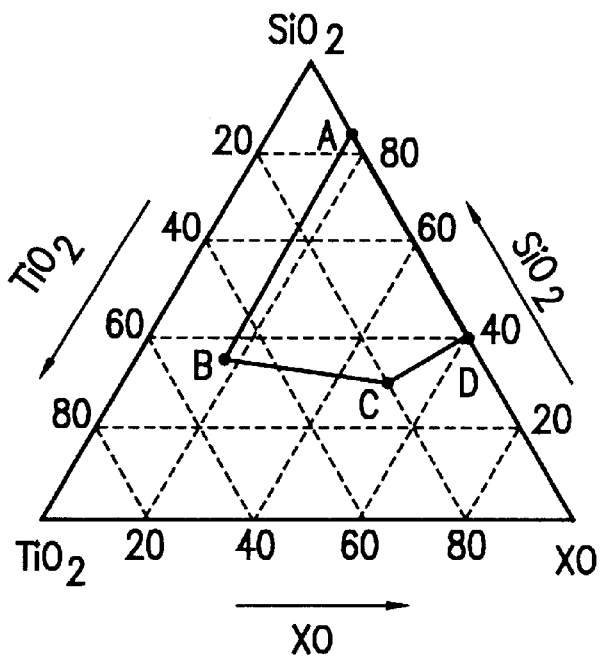
FIG. 3 is a ternary composition diagram of an $SiO_2$—$TiO_2$—XO-based nonreducing oxide glass.

As is obvious from Tables 5 and 6 with respect to the second nonreducing oxide glass represented by the formula represented by the formula $xSiO_2$-$yTiO_2$-$zXO$ (where XO is at least one oxide selected from the group consisting of BaO, CaO, SrO, MgO, ZnO and MnO, and x, y, and z refer to mole %), when, in the ternary composition diagram shown in FIG. 3, the ratio (x, y, z) lies within a polygon, including the sides of the polygon, obtained by linking point A (85, 1, 14), point B (35, 51, 14), point C (30, 20, 50) and point D (39, 1, 60), namely, in sample Nos. 201 to 216, the generated pulse voltage is as high as 1.8 kV or more, and even if exposed in a high-temperature reducing atmosphere, the generated pulse voltage is not easily decreased.

In contrast, when the $SiO_2$—$TiO_2$—XO-based nonreducing oxide glass is out of the compositional range described above, as in sample Nos. 217 to 225, the pulse voltage does not exceed 1.8 kV and the AC dielectric breakdown voltage does not exceed 6 kV/mm.

As in sample Nos. 211 and 212, by including $Al_2O_3$ and/or $ZrO_2$ in the $SiO_2$—$TiO_2$—XO-based oxide glass, pulse generating capacitors which generate pulse voltages that exceed 1.8 kV are obtained. However, as in sample Nos. 221 and 222, if the content of $Al_2O_3$ exceeds about 15 parts by weight or the content of $ZrO_2$ exceeds about 5 parts by weight, the pulse voltage is significantly decreased.

As in sample Nos. 213 to 216, by including $Li_2O$ and/or $B_2O_3$ in the $SiO_2$—$TiO_2$—XO-based oxide glass, pulse generating capacitors which generate pulse voltages that exceed 1.8 kV are obtained. However, as in sample Nos. 224 and 225, if the total content of $Li_2O$ and $B_2O_3$ exceeds about 20 parts by weight relative to 100 parts by weight of the $SiO_2$—$TiO_2$—XO-based nonreducing oxide glass, the pulse voltage does not exceed 1.8 kV.

EXAMPLE 4

In a manner similar to that in example 1, raw materials for a barium titanate-based compound represented by the formula $(Ba_{0.958}Sr_{0.03}Ca_{0.01}Mg_{0.002}O)_{1.003} \cdot (Ti_{0.92}Zr_{0.06}Hf_{0.02})O_2$ a first nonreducing oxide glass represented by the formula $0.25Li_2O-0.65(0.30TiO_2 \cdot 0.70SiO_2)-0.10Al_2O_3$ (molar ratio)– and a second nonreducing oxide glass represented by the formula $0.66SiO_2O_2-0.17TiO_2-0.15BaO-0.02MnO$ (molar ratio)

were prepared.

Next, metal oxides having purities of 99% or more were prepared, including CoO, $MnCO_3$, NiO, $La_2O_3$, $Nd_2O_3$, $CeO_2$, $Pr_6O_{11}$, $Sm_2O_3$, $Eu_2O_3$, $Gd_2O_3$, $Tb_2O_3$, $Dy_2O_3$, $Ho_2O_3$, $Er_2O_3$, $Yb_2O_3$ and $Y_2O_3$.

The first and second nonreducing oxide glasses and the metal oxides described above were added to the raw materials for the barium titanate-based compound described above so as to satisfy the compositions shown in Table 7, and at the sintering temperatures shown in Table 8, and otherwise in a manner similar to that in example 1, pulse generating capacitors were produced. The size and shape of the pulse generating capacitors were the same as those in example 1.

Next, in a manner similar to that in example 1, the generated pulse voltage, the volume resistivity and the AC dielectric breakdown voltage were obtained. The results are shown in Table 8.

TABLE 7

| Sample No. | First non-reducing oxide glass (parts by weight) | Second non-reducing oxide glass (parts by weight) | MnO (a) | NiO (b) | CoO (c) | Total (a)~(c) | $La_2O_3$ (d) | $CeO_2$ (e) | $Nd_2O_3$ (f) | $Pr_6O_{11}$ (g) | $Sm_2O_3$ (h) | $Eu_2O_3$ (i) | $Gd_2O_3$ (j) |
|---|---|---|---|---|---|---|---|---|---|---|---|---|---|
| 301 | 0.1 | 0 | 0.3 | 0.3 | 0.2 | 0.8 | 0.2 | 0 | 0 | 0 | 0.1 | 0 | 0 |
| 302 | 0.2 | 0 | 0.1 | 0.3 | 0 | 0.4 | 0 | 0.3 | 0 | 0 | 0 | 0 | 0 |
| 303 | 0.6 | 0 | 0 | 0.05 | 0.3 | 0.35 | 0 | 0 | 0 | 0.3 | 0 | 0 | 0 |
| 304 | 0 | 0.05 | 0.4 | 0.1 | 0.3 | 0.8 | 0.1 | 0 | 0 | 0 | 0 | 0 | 0 |
| 305 | 0 | 0.02 | 0.1 | 0.1 | 0.1 | 0.3 | 0 | 0.4 | 0.2 | 0 | 0 | 0 | 0.2 |
| 306 | 0 | 0.08 | 0 | 0.05 | 0 | 0.05 | 0 | 0 | 0 | 0.3 | 0.1 | 0 | 0 |
| 307 | 0.01 | 0 | 0.3 | 0.1 | 0.1 | 0.5 | 0 | 0 | 0 | 0 | 0 | 0 | 0 |
| 308 | 0.2 | 0 | 0 | 0.2 | 0.05 | 0.25 | 0 | 0.2 | 0 | 0 | 0 | 0.1 | 0 |
| 309 | 0.1 | 0 | 0.2 | 0.1 | 0.05 | 0.35 | 0 | 0.1 | 0 | 0.2 | 0 | 0 | 0 |
| 310 | 0 | 0.1 | 0.2 | 0.2 | 0.1 | 0.5 | 0 | 0 | 0 | 0 | 0 | 0 | 0.1 |
| 311 | 0 | 0.05 | 0 | 0 | 0 | 0 | 0 | 0 | 0.1 | 0 | 0 | 0.3 | 0 |
| 312 | 0 | 0.5 | 0.3 | 0 | 0.05 | 0.35 | 0.1 | 0 | 0 | 0.1 | 0 | 0 | 0 |
| 313 | 0.01 | 0 | 0.2 | 0.3 | 0 | 0.5 | 0 | 0 | 0 | 0 | 0 | 0 | 0 |
| 314 | 0.3 | 0 | 0 | 0 | 0.3 | 0.3 | 0 | 0.1 | 0 | 0 | 0.1 | 0 | 0 |
| 315 | 0.8 | 0 | 0.2 | 0.05 | 0.1 | 0.35 | 0 | 0.1 | 0 | 0.2 | 0 | 0 | 0 |
| 316 | 0 | 0.1 | 0.3 | 0 | 0.2 | 0.5 | 0 | 0 | 0 | 0 | 0 | 0 | 0 |
| 317 | 0 | 0.08 | 0 | 0.1 | 0.2 | 0.3 | 0 | 0 | 0 | 0 | 0 | 0 | 0 |
| 318 | 0 | 0.06 | 0.4 | 0 | 0 | 0.4 | 0.1 | 0 | 0 | 0.1 | 0 | 0 | 0.1 |

| Sample No. | $Tb_2O_3$ (k) | $Dy_2O_3$ (l) | $Ho_2O_3$ (m) | $Er_2O_3$ (n) | $Yb_2O_3$ (o) | $Y_2O_3$ (p) | Total (d)~(p) | Amount added (a)~(p) (parts by weight) |
|---|---|---|---|---|---|---|---|---|
| 301 | 0 | 0 | 0 | 0 | 0.1 | 0 | 0.4 | 0.84 |
| 302 | 0 | 0.2 | 0 | 0.2 | 0 | 0.1 | 0.8 | 0.95 |
| 303 | 0 | 0 | 0 | 0 | 0.1 | 0 | 0.4 | 1.57 |
| 304 | 0 | 0 | 0.1 | 0.2 | 0 | 0 | 0.4 | 0.87 |
| 305 | 0 | 0 | 0 | 0 | 0 | 0 | 0.8 | 0.8 |
| 306 | 0 | 0 | 0 | 0 | 0 | 0 | 0.4 | 1.46 |
| 307 | 0.2 | 0 | 0 | 0 | 0 | 0.1 | 0.3 | 0.56 |
| 308 | 0 | 0 | 0.2 | 0 | 0 | 0 | 0.5 | 0.61 |
| 309 | 0 | 0 | 0 | 0 | 0 | 0 | 0.3 | 1 |
| 310 | 0 | 0.1 | 0 | 0 | 0 | 0 | 0.2 | 0.46 |
| 311 | 0 | 0 | 0 | 0 | 0 | 0.1 | 0.5 | 0.68 |
| 312 | 0 | 0.1 | 0 | 0 | 0.1 | 0 | 0.4 | 1 |
| 313 | 0 | 0 | 0 | 0 | 0 | 0 | 0 | 0.15 |
| 314 | 0.1 | 0 | 0 | 0.1 | 0 | 0.1 | 0.5 | 0.68 |
| 315 | 0 | 0 | 0 | 0 | 0 | 0 | 0.3 | 1 |
| 316 | 0 | 0 | 0.3 | 0 | 0 | 0 | 0.3 | 0.63 |
| 317 | 0 | 0 | 0 | 0 | 0.1 | 0.2 | 0.3 | 0.45 |
| 318 | 0 | 0 | 0 | 0.1 | 0 | 0 | 0.4 | 1 |

TABLE 8

| Sample No. | Firing temperature (° C.) | Generated pulse voltage (kV) −40° C. | Room temperature | 50° C. | Volume resistivity ρ (Ω · m) | 400° C./1 × 10⁻⁵ Torr/ 0.5% $H_2$/1000 hr Generated pulse voltage (kV) | Volume resistivity ρ (Ω · m) | 125° C./100 V/240 hr Generated pulse voltage (kV) | Volume resistivity ρ (Ω · m) | AC dielectric breakdown voltage (kV/mm) |
|---|---|---|---|---|---|---|---|---|---|---|
| 301 | 1340 | 1.55 | 1.48 | 1.41 | $2.86 \times 10^{11}$ | 1.49 | $2.85 \times 10^{11}$ | 1.11 | $8.08 \times 10^{8}$ | 6.28 |
| 302 | 1330 | 2.07 | 2.04 | 1.68 | $4.84 \times 10^{10}$ | 1.73 | $4.85 \times 10^{10}$ | 2.02 | $4.81 \times 10^{10}$ | 6.37 |
| 303 | 1390 | 1.68 | 1.62 | 1.54 | $6.05 \times 10^{12}$ | 1.61 | $6.04 \times 10^{12}$ | 1.61 | $6.03 \times 10^{12}$ | 6.72 |
| 304 | 1330 | 1.61 | 1.55 | 1.51 | $6.38 \times 10^{11}$ | 1.53 | $6.38 \cdot 10^{8}$ | 1.24 | $4.19 \times 10^{8}$ | 6.21 |
| 305 | 1320 | 2.09 | 2.05 | 1.63 | $4.06 \times 10^{10}$ | 1.77 | $4.04 \times 10^{10}$ | 2.02 | $4.05 \times 10^{10}$ | 6.08 |

TABLE 8-continued

| | Firing | Generated pulse voltage (kV) | | | Volume | 400° C./1 × 10⁻⁵ Torr/ 0.5% H₂/1000 hr | | 125° C./100 V/240 hr | | AC dielectric |
| | temper- | | | | | | | Generated | Volume | breakdown |
| Sample | ature | | Room | | resistivity ρ | Generated pulse | Volume resistivity | pulse | resistivity | voltage |
| No. | (° C.) | −40° C. | temperature | 50° C. | (Ω · m) | voltage (kV) | ρ (Ω · m) | voltage (kV) | ρ (Ω · m) | (kV/mm) |
|---|---|---|---|---|---|---|---|---|---|---|
| 306 | 1350 | 1.59 | 1.54 | 1.43 | 4.42 × 10¹² | 1.54 | 4.41 × 10¹² | 1.51 | 4.42 × 10¹² | 6.24 |
| 307 | 1370 | 2.11 | 2.07 | 2.02 | 6.53 × 10¹² | 2.98 | 6.53 × 10¹² | 2.07 | 6.51 × 10¹² | 6.12 |
| 308 | 1350 | 2.08 | 2.06 | 1.97 | 6.83 × 10¹² | 2.06 | 6.82 × 10¹² | 2.05 | 6.84 × 10¹² | 6.45 |
| 309 | 1360 | 2.14 | 2.11 | 2.06 | 2.66 × 10¹² | 2.12 | 2.67 × 10¹² | 2.12 | 2.65 × 10¹² | 6.31 |
| 310 | 1370 | 2.17 | 2.13 | 2.08 | 6.48 × 10¹² | 2.11 | 6.46 × 10¹² | 2.12 | 6.48 × 10¹² | 6.34 |
| 311 | 1350 | 2.11 | 2.08 | 2.03 | 3.63 × 10¹² | 1.98 | 3.62 × 10¹² | 2.1 | 3.62 × 10¹² | 6.18 |
| 312 | 1370 | 2.08 | 2.06 | 1.96 | 3.52 × 10¹² | 2.06 | 3.52 × 10¹² | 2.04 | 3.53 × 10¹² | 6.68 |
| 313 | 1380 | 2.12 | 2.10 | 2.05 | 2.68 × 10¹² | 2.12 | 2.68 × 10¹² | 1.97 | 2.66 × 10¹² | 6.11 |
| 314 | 1350 | 2.13 | 2.08 | 1.99 | 3.02 × 10¹² | 2.09 | 3.01 × 10¹² | 2.08 | 3.00 × 10¹² | 6.56 |
| 315 | 1360 | 2.11 | 2.09 | 2.04 | 6.50 × 10¹² | 2.07 | 6.51 × 10¹² | 2.07 | 6.48 × 10¹² | 6.84 |
| 316 | 1340 | 2.08 | 2.06 | 1.98 | 6.38 × 10¹² | 2.05 | 6.37 × 10¹² | 2.08 | 6.38 × 10¹² | 6.29 |
| 317 | 1370 | 2.15 | 2.12 | 2.07 | 2.67 × 10¹² | 2.12 | 2.66 × 10¹² | 2.11 | 2.66 × 10¹² | 6.02 |
| 318 | 1360 | 2.12 | 2.08 | 2.01 | 3.51 × 10¹² | 2.09 | 3.50 × 10¹² | 2.08 | 3.51 × 10¹² | 6.23 |

As is obvious from Tables 7 and 8, by including either an oxide of at least one element selected from the group consisting of Mn, Ni and Co, or an oxide of at least one element selected from the group consisting of La, Ce, Nd, Pr, Sm, Eu, Gd, Tb, Dy, Ho, Er, Yb and Y, in an amount of about 0.5 parts by weight or less relative to 100 parts by weight of the barium titanate-based compound, as in sample Nos. 307 to 318, the generated pulse voltage is as high as 1.8 kV/mm or more, and even if exposed in a high-temperature reducing atmosphere, the generated pulse voltage is not easily decreased, which is desirable.

In contrast, as in sample Nos. 302 and 305, if the content of the oxide of at least one element selected from the group consisting of La, Ce, Nd, Pr, Sm, Eu, Gd, Tb, Dy, Ho, Er, Yb and Y exceeds about 0.5 mole relative to 100 mole of the barium titanate-based compound, the pulse voltage at high temperatures does not exceed 1.8 kV.

As in sample Nos. 301 and 304, if the content of the oxide of at least one element selected from the group consisting of Mn, Ni and Co exceeds about 0.5 mole relative to 100 mole of the barium titanate-based compound, the pulse voltage at room temperature is decreased. Changes over time due to high-temperature load are also increased.

As in sample Nos. 303 and 306, if the total content of the oxide of at least one element selected from the group consisting of La, Ce, Nd, Pr, Sm, Eu, Gd, Tb, Dy, Ho, Er, Yb and Y and the oxide of at least one element selected from the group consisting of Mn, Ni and Co exceeds about 1.0 parts by weight relative to 100 parts by weight of the barium titanate-based compound, the pulse voltages at room temperature and high temperatures do not exceed 1.8 kV.

EXAMPLE 5

A pulse generating capacitor A, which was within the scope of the present invention, according to sample No. 310 in example 4 was prepared. A high-pressure sodium lamp as a high-pressure vapor discharge lamp in which the capacitor A was enclosed in a bulb was produced.

As a comparative example, a pulse generating capacitor B, which was out of the scope of the present invention, according to sample No. 1 in example 1, was prepared. A high-pressure sodium lamp in which the capacitor B was enclosed in a bulb was produced.

As another comparative example, a high-pressure sodium lamp in which the capacitor B was enclosed in a bulb and a hydrogen-adsorbing getter having the ratio Zr/Al=87/13 (weight percentage) was also provided in the bulb was produced.

With respect to the above high-pressure sodium lamps, lighting tests were conducted. A 400 W high-pressure mercury lamp ballast (input voltage: 220V, 60 Hz) was used for lighting and the lighting cycle was set at 10 hour-On/1 hour-Off.

Figure 8:
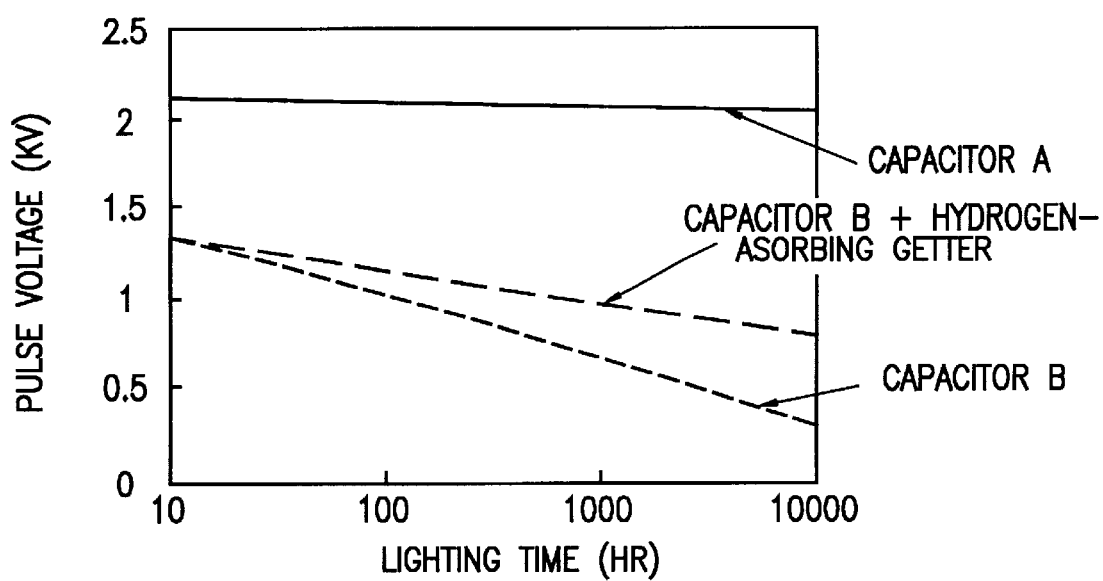
FIG. 8 is a graph which shows the relationship between the lighting time and pulse voltage generated.

FIG. 8 shows the change in the generated pulse voltage in relation to the lighting time. As is clear from FIG. 8, the pulse voltage does not substantially change in the high-pressure vapor discharge lamp in accordance with the present invention. In contrast, the pulse voltage decreases over time even if the hydrogen-adsorbing getter is provided in high-pressure sodium lamps in accordance with comparative examples.

As described above, the pulse generating capacitor using a nonlinear dielectric ceramic in accordance with the present invention has reduction resistance and has steep D-E hysteresis characteristics over a wide temperature range. A high pulse voltage can also be generated over a wide temperature range, and even if exposed in a high-temperature high vacuum or in a reducing atmosphere, the characteristics are not degraded. The pulse generating capacitor in accordance with the present invention does not need to be entirely coated with insulating glass and the characteristics are not degraded by insulating glass. Furthermore, the capacitor in itself has a high AC dielectric breakdown voltage.

Therefore, by using the pulse generating capacitor in accordance with the present invention as a ballast, a high-pressure vapor discharge lamp, such as a high-pressure sodium lamp, having excellent lighting characteristics can be obtained. In particular, since the pulse generating capacitor can be used for a high-pressure vapor discharge lamp in which a starter is built in a bulb of the discharge lamp, and it is not required to install a hydrogen-adsorbing getter in the bulb, an inexpensive high-pressure discharge lamp with a built-in starter can be obtained.

What is claimed is:

1. A nonlinear dielectric ceramic having D-E hysteresis characteristics and reduction resistance comprising:

a barium titanate compound represented by the formula

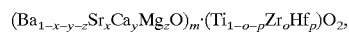

wherein subscripts x, y, z, m, o, and p satisfy the relationships $0 \leq x \leq 0.05$, $0 \leq y \leq 0.02$, $0 \leq z \leq 0.005$, $0.995 \leq m \leq 1.02$, $0 \leq o \leq 0.12$, $0 \leq p \leq 0.12$ and $0.035 \leq o+p \leq 0.12$ as a principal constituent; and a nonreducing oxide glass as a secondary constituent; wherein the nonreducing oxide glass comprises at least one first nonreducing oxide glass or second nonreducing oxide glass, the first nonreducing oxide glass being represented by the formula $$xLi_2O\text{-}y(Si_wTi_{1-w})O_2\text{-}zMO$$

where MO is at least one of $Al_2O_3$ and $ZrO_2$, and where x, y and z refer to mole %, and subscript w satisfies the relationship $0.30 \leq w \leq 1.0$, and in a ternary composition diagram, the points (x, y, z) lie within a polygon, including the sides of the polygon, obtained by linking points A (20, 80, 0), point B (10, 80, 10), point C (10, 70, 20), point D (35, 45, 20), point E (45, 45, 10) and point F (45, 55, 0), provided that $w<1.0$ when the point lies on the line A-F, and the second nonreducing oxide glass being represented by the formula $$SiO_2\text{—}TiO_2\text{—}XO$$

where XO is at least one oxide selected from the group consisting of BaO, CaO, SrO, MgO, ZnO and MnO.

2. A nonlinear dielectric ceramic according to claim 1, wherein the content of the nonreducing oxide glass is about 0.8 parts by weight or less relative to 100 parts by weight of the barium titanate compound.

3. A nonlinear dielectric ceramic according to claim 2, wherein the second nonreducing oxide glass is represented by the formula $$xSiO_2\text{-}yTiO_2\text{-}zXO$$

where and x, y and z refer to mole %, and in a ternary composition diagram the point (x, y, z) lies within a polygon, including the sides of the polygon, obtained by linking point A (85, 1, 14), point B (35, 51, 14), point C (30, 20, 50) and point D (39, 1, 60).

4. A nonlinear dielectric ceramic according to claim 3, wherein the second nonreducing oxide glass contains (a) at least one of $Al_2O_3$ and $ZrO_2$ in an amount of 15 parts by weight or less in total, and the content of $ZrO_2$ is about 5 parts by weight or less, relative to 100 parts by weight of the $SiO_2$—$TiO_2$—XO nonreducing oxide glass or (b) at least one of $Li_2O$ and $B_2O_3$ in an amount of about 20 parts by weight or less in total relative to 100 parts by weight of the $SiO_2$—$TiO_2$—XO nonreducing oxide glass or (c) both.

5. A nonlinear dielectric ceramic according to claim 4, wherein the nonlinear dielectric ceramic contains (a) an oxide of at least one element selected from the group consisting of La, Ce, Nd, Pr, Sm, Eu, Gd, Tb, Dy, Ho, Er, Yb and Y in an amount of about 0.5 mole or less relative to 100 mole of the barium titanate-based compound or (b) an oxide of at least one element selected from the group consisting of Mn, Ni, and Co in an amount of about 0.5 mole or less relative to 100 mole of the barium titanate-based compound or (c) both.

6. A pulse generating capacitor, adapted for use in a bulb of a high-pressure vapor discharge lamp, comprising a dielectric material and electrodes on the dielectric material, wherein the dielectric material comprises a nonlinear dielectric ceramic according to claim 5.

7. A high-pressure vapor discharge lamp circuit comprising a series circuit comprising a pulse generating capacitor according to claim 6 and a switch and a luminous tube, wherein the series circuit is electrically connected to the luminous tube in parallel.

8. A high-pressure vapor discharge lamp comprising a pulse generating capacitor according to claim 6 and a luminous tube, wherein the capacitor and the luminous tube are electrically connected to each other in parallel and enclosed in a bulb.

9. A pulse generating capacitor, adapted for use in a bulb of a high-pressure vapor discharge lamp, comprising a dielectric material and electrodes on the dielectric material, wherein the dielectric material comprises a nonlinear dielectric ceramic according to claim 2.

10. A high-pressure vapor discharge lamp circuit comprising a series circuit comprising a pulse generating capacitor according to claim 9 and a switch and a luminous tube, wherein the series circuit is electrically connected to the luminous tube in parallel.

11. A high-pressure vapor discharge lamp comprising a pulse generating capacitor according to claim 9 and a luminous tube, wherein the capacitor and the luminous tube are electrically connected to each other in parallel and enclosed in a bulb.

12. A nonlinear dielectric ceramic according to claim 1, wherein the nonlinear dielectric ceramic contains (a) an oxide of at least one element selected from the group consisting of La, Ce, Nd, Pr, Sm, Eu, Gd, Tb, Dy, Ho, Er, Yb and Y in an amount of about 0.5 mole or less relative to 100 mole of the barium titanate-based compound or (b) an oxide of at least one element selected from the group consisting of Mn, Ni, and Co in an amount of about 0.5 mole or less relative to 100 mole of the barium titanate-based compound or (c) both.

13. A pulse generating capacitor, adapted for use in a bulb of a high-pressure vapor discharge lamp, comprising a dielectric material and electrodes on the dielectric material, wherein the dielectric material comprises a nonlinear dielectric ceramic according to claim 1.

14. A high-pressure vapor discharge lamp circuit comprising a series circuit comprising a pulse generating capacitor according to claim 13 and a switch and a luminous tube, wherein the series circuit is electrically connected to the luminous tube in parallel.

15. A high-pressure vapor discharge lamp comprising a pulse generating capacitor according to claim 13 and a luminous tube, wherein the capacitor and the luminous tube are electrically connected to each other in parallel and enclosed in a bulb.

16. A nonlinear dielectric ceramic according to claim 1, wherein the nonreducing oxide glass comprises at least one of said first nonreducing oxide glass and at least one said second nonreducing oxide glass.

17. A nonlinear dielectric ceramic according to claim 1, wherein the barium titanate-based compound is represented by said formula $$(Ba_{1-x-y-z}Sr_xCa_yMg_zO)_m \cdot (Ti_{1-o-p}Zr_oHf_p)O_2$$

in which at least one of said subscripts x, y, z, o and p is greater than 1.

18. A pulse generating capacitor, adapted for use in a bulb of a high-pressure vapor discharge lamp, comprising a dielectric material and electrodes on the dielectric material, wherein the dielectric material comprises a nonlinear dielectric ceramic according to claim 17.

19. A high-pressure vapor discharge lamp circuit comprising a series circuit comprising a pulse generating capacitor according to claim 18 and a switch and a luminous tube, wherein the series circuit is electrically connected to the luminous tube in parallel.

20. A high-pressure vapor discharge lamp comprising a pulse generating capacitor according to claim 18 and a luminous tube, wherein the capacitor and the luminous tube are electrically connected to each other in parallel and enclosed in a bulb.

* * * * *